United States Patent [19]

Goldberg

[11] Patent Number: 4,670,784
[45] Date of Patent: Jun. 2, 1987

[54] METHODS FOR COPING WITH NON-UNIFORM PHOSPHOR AGING IN DUAL MODE TELEVISION RECEIVERS

[75] Inventor: Abraham A. Goldberg, Stamford, Conn.

[73] Assignee: CBS, Inc., New York, N.Y.

[21] Appl. No.: 883,006

[22] Filed: Jul. 7, 1986

Related U.S. Application Data

[63] Continuation of Ser. No. 722,917, Apr. 15, 1985, abandoned.

[51] Int. Cl.$^4$ .......................... H04N 7/40; H04N 5/68
[52] U.S. Cl. .................................... 358/141; 358/242; 445/6; 313/461
[58] Field of Search .......................... 313/461; 445/6; 358/230, 242, 141

[56] References Cited

U.S. PATENT DOCUMENTS 4,338,623  7/1982  Asmus et al. ........................ 358/22
4,492,982  1/1985  Takimoto et al. ................... 358/228

*Primary Examiner*—Howard W. Britton
*Assistant Examiner*—John K. Peng
*Attorney, Agent, or Firm*—Spencer E. Olson; Lewis H. Eslinger

[57] ABSTRACT

Methods and apparatus for solving the problem of non-uniform phosphor aging of the screen of a dual mode television receiver having the capability of displaying the picture image in two different aspect ratios, for example, 4:3 and 5:3. In one embodiment, the entire screen is illuminated during display of a 4:3 aspect ratio image on the central area of the screen so as to effect uniformity of aging over the entire screen. Alternatively, the areas at either side of the central 4:3 aspect ratio image area are not illuminated during display of 4:3 aspect ratio images but are, instead, post-aged following a period of display of such images. Another solution is to electrically compensate for the faster aging of the central 4:3 aspect ratio are of the screen when viewing 5:3 aspect ratio pictures.

20 Claims, 7 Drawing Figures

METHODS FOR COPING WITH NON-UNIFORM PHOSPHOR AGING IN DUAL MODE TELEVISION RECEIVERS

This is a continuation of co-pending application Ser. No. 722,917 filed on Apr. 15, 1985 now abandoned.

BACKGROUND OF THE INVENTION

This invention relates to television receivers capable of presenting the picture image in two different aspect ratios and, more particularly, to dual mode television receivers having the capability of coping with non-uniform phosphor aging caused by the showing of different aspect ratio pictures on a common display.

High definition television (HDTV) systems are being promulgated which by virtue of higher horizontal and vertical resolutions than found in conventional systems (e.g., NTSC) yield sharper pictures and better color. Instead of the 525 or 625 scanning lines used in conventional television, HDTV employs upward of a thousand lines and the picture is presented with a wider aspect ratio. More particularly, instead of the 4:3 aspect ratio that has been used since present television standards were established 40 years ago, most proposed HDTV formats use a 5:3 aspect ratio for the video screen. One such system proposed by CBS Inc. involves the transmission of two signals: one to provide a conventional television image on extant television sets, and the other signal, transmitted separately but simultaneously, would fill in the missing detail and add the extra scanning lines to the screen to provide a high-resolution 5:3 aspect ratio picture with 1,050 scanning lines and truer color. Viewers wanting this improved picture would require a new dual mode receiver to capture both signals and combine them into the high-quality display.

Thus, with the advent of HDTV it will be necessary to manufacture television receivers capable of reproducing NTSC as well as HDTV pictures, having different aspect ratios, on a common display, such as a cathode ray picture tube. Thus, as illustrated in FIG. 1 in which the two pictures are shown superimposed, the NTSC pictures have an aspect ratio of four units wide to three units high (4:3), while the HDTV pictures have an aspect ratio of five units wide to three units high (5:3) or greater. The 4:3 image occupies the area Y, and the 5:3 image occupies the total area including the central area Y and two equal width areas X at either side. The display on a common screen of pictures having different aspect ratios will pose the problem of uneven aging of the phosphor screen; whenever NTSC pictures are reproduced the areas X will not be illuminated whereas the phosphor in area Y will be aging due to illumination of this area. This will result in a "burn" pattern on the screen with the consequence that when an HDTV picture is displayed, the central area Y will be darker than the areas X.

The uneven phosphor aging problem presented in the dual mode receiver is very different from the screen burn-in of a picture having, for example, bright lines or other picture components remaining stationary for a long period of time, addressed by the protection circuit described in U.S. Pat. No. 4,338,623 wherein a video circuit is examined to detect how long the information has not been changed and, if a predetermined time limit is exceeded, limiting the picture brightness to a sufficiently low average value or, if so desired, to zero brightness. The problem also differs from the burning phenomenon that takes place on the photoelectric face in a video camera utilizing an imaging tube, when an object of a high luminance is exposed to the face, addressed by the burn-in prevention apparatus disclosed in U.S. Pat. No. 4,492,982. The system described in this patent for prevent burning of the imaging tube detects the function state of the imaging tube at the start of power supply thereto and controls an exposure control circuit for controlling the amount of light entering the imaging tube as a function of such detection.

SUMMARY OF THE INVENTION

The present invention is intended to solve the problem of non-uniform phosphor aging in dual mode television receivers discussed above, and its object is to provide in such a television receiver relatively inexpensive circuitry for coping with the problem. According to a first embodiment of the invention the entire display screen is illuminated when an NTSC television program (or a PAL or SECAM program in other regions of the world) is being viewed so as to effect uniform aging of the entire screen. According to a second embodiment, circuit means are provided for post-aging the areas X of the screen, during a period when the display is not being viewed, following extended viewing of NTSC television programs. A third embodiment of the invention comprises a circuit for electrically compensating for the burn pattern when viewing HDTV on the display screen.

BRIEF DESCRIPTION OF THE DRAWINGS

Other objects, features and advantages of the invention, and a better understanding of its construction and operation, will be had from the following detailed description taken in conjunction with the accompanying drawings, in which.

DESCRIPTION OF THE PREFERRED EMBODIMENTS

The invention will be described in the context of a dual mode television receiver having the capability of displaying on a common cathode ray tube screen either NTSC pictures with 4:3 aspect ratio or pictures reproduced from a video signal of a hypothetical HDTV system. However, it is to be understood that the principles of the invention are applicable to any 525-line or 625-line television system in association with other HDTV systems than the one specifically described herein. The following Table 1 lists the values of the scanning parameters of the existing NTSC television system and of a hypothetical HDTV system:

TABLE 1

| Parameter | NTSC | HDTV |
| --- | --- | --- |
| Image aspect ratio | 4:3 | 5:3 |
| Total scan lines | 525 | 1050 |
| Active scan lines | 485 | 970 |
| Fields per second | 60 | 60 |
| Interlace ratio | 2:1 | 2:1 |
| Horizontal scan. freq. (Hz) | 15734 | 31468 |
| Vertical scan freq. (Hz) (nominal) | 60 | 60 |
| Total H. scan. period ($\mu$s) | 63.55 | 31.78 |
| H blanking period ($\mu$s) | 10.9 | 5.45 |
| Active video period ($\mu$s) | 52.65 | 26.33 |

Figure 1:
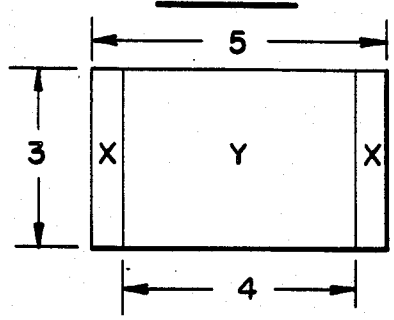
FIG. 1 to which reference has already been made, is a diagram showing the superposition of television images having two different aspect ratios.

The dual mode receiver includes two sets of scan parameters, one set for achieving NTSC display and the other set comprising the indicated HDTV scan parameters, both of which may be provided with scan circuitry of conventional design well known to ones skilled in the television art. The NTSC scan parameters produce a 4:3 aspect ratio image on the screen having an active video period of 52.6 microseconds, whereas the HDTV scan circuit produces an image aspect ratio of 5:3 and, because it has 1,050 scan lines instead of the 525 lines for NTSC, the active video period is 31.78 microseconds. In use, the scan circuit appropriate to the received video signal, that is, NTSC or HDTV, is selected by electrically switching either the NTSC or the HDTV parameter values, respectively, into the scan circuit. Alternatively, the receiver may have a single scan circuit having only the HDTV scan parameter values for displaying the HDTV signal and which can also be used for NTSC reception by modifying the NTSC video signal to make it compatible with the HDTV scan values. Regardless of whether the receiver has a scan circuit with selectable parameter values or has only a scan circuit having HDTV scan parameters, the NTSC picture will fit within the central area Y of FIG. 1 and the HDTV picture will occupy the areas X and Y having a 5:3 aspect ratio; to do otherwise will geometrically distort or crop the pictures.

Thus, it is seen that regardless of which type of scan is used, the NTSC picture illuminates only the area Y and causes this area to age whereas the non-illuminated areas X are not aging. This will result in a "burn" pattern such that the Y area will be darker than the edge areas X when an HDTV video signal is reproduced on the screen.

According to one embodiment of the present invention, the "burn" pattern is eliminated by extending the raster so as to also illuminate the areas X of the display screen when 4:3 aspect ratio NTSC pictures are displayed, thereby to insure uniform aging of the screen. This approach is especially applicable when the scan circuit utilizes HDTV scan values during reception of NTSC picture information, in which case the waveforms shown in FIG. 2 apply.

As shown, the total horizontal period is 31.78 microseconds consisting of a 5.45 microseconds horizontal blanking period followed by the horizontal scan, the active period of which is 26.33 microseconds. In order for a received NTSC signal, which has an active video period of 52.65 microseconds, to occupy the picture area Y of FIG. 1, it must be time-compressed to have an active duration of 21.06 microseconds. That is, it must undergo time compression by a factor $k=(21.06\div52.65)=0.4$.

Figure 3A:
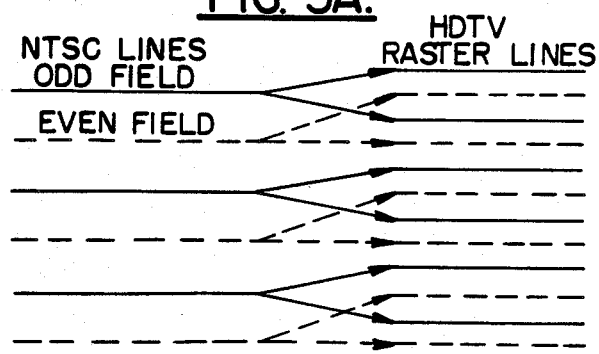
FIG. 3A is a diagram illustrating the application of an NTSC video signal to a HDTV display.
Figure 3:
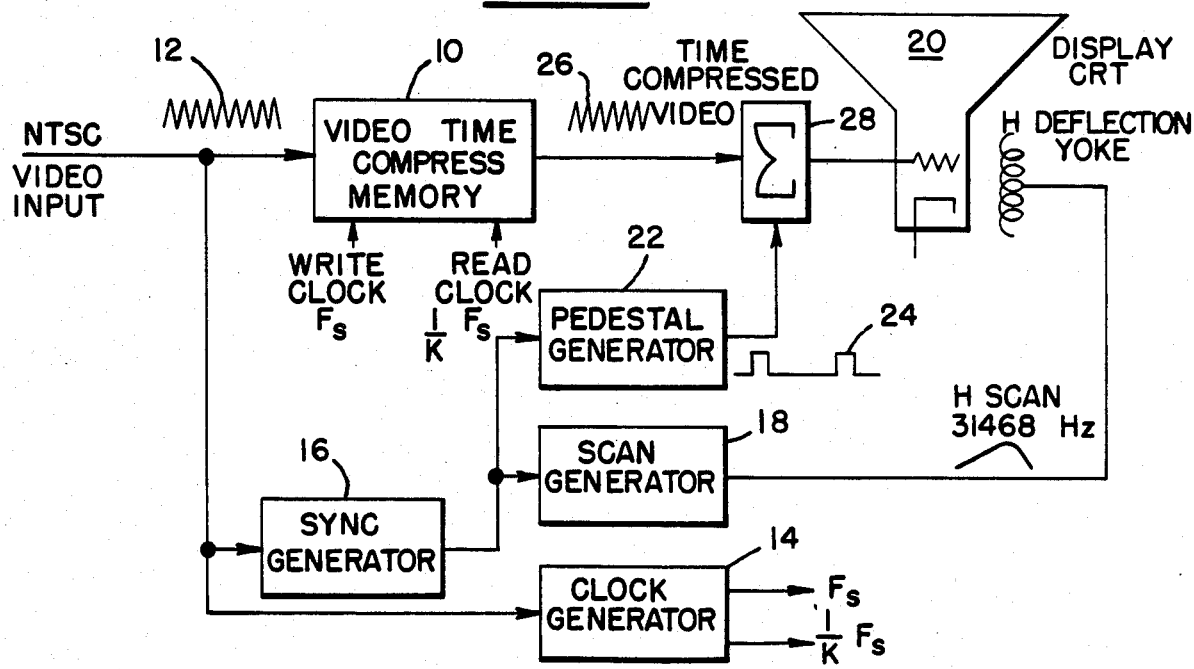
FIG. 3 is a block diagram of a receiver circuit for causing uniform screen aging when viewing NTSC pictures on an HDTV raster.

With reference to the simplified block diagram of the television receiver shown in FIG. 3, this time compression is accomplished by a circuit 10 that writes the input signal 12 into memory at a sampling rate $F_s$ and reads out of memory at a rate $(1\div k)F_s$. The read and write clock pulses are generated by a clock generator 14 which, in turn, is controlled by the color burst extracted from the incoming NTSC signal 12. The write pulses $F_s$ typically have a frequency of 3 $F_{sc}=10.74$ MHz where $F_{sc}$ is the 3.58 MHz NTSC color subcarrier frequency, making the frequency of the read clock pulses equal to $(1\div k)\times 3F_{sc}=26.85$ MHz. Such time compression systems are known to ones versed in the art and can readily be designed for this application.

Horizontal sync pulses generated by sync generator 16 are applied to a scan generator 18 and times the initiation of the 31468 Hz horizontal scan waveform of the display presented on the screen of a cathode ray tube 20. Additionally, the sync pulses generated by generator 16 are applied to a pedestal generator 22 which generates a pedestal pulse waveform 24, the pulses of which have a duration of 2.64 microseconds and occur immediately before and immediately after the active horizontal period for the time-compressed NTSC video signal. The amplitude of the pedestal pulses is such that when they are combined with the time-compressed video signal 26 in an adder 28 and applied to the grid of the display tube, they cause the areas X of the display screen to be illuminated at mid-gray level, substantially equal to the average level of illumination caused by the time-compressed NTSC picture signal. Thus, the entire image area of the screen is substantially uniformly illuminated, even though a picture is displayed only on the area Y, thereby to insure substantially uniform aging of the phosphor screen. Obviously, when HDTV picture information is displayed, the entire area is illuminated to insure uniform aging in this operational mode as well.

Each of the active lines of the NTSC video signal is applied to two time sequential lines of the 1050-line display as shown in FIG. 3A. This is accomplished by reading the video time compress memory 10 twice for each NTSC line written into the memory.

For the sake of simplicity, only the luminance video signal processing has been described. However, it will be understood that a color television system will also require a similar processing of the chrominance video signal.

Figure 4:
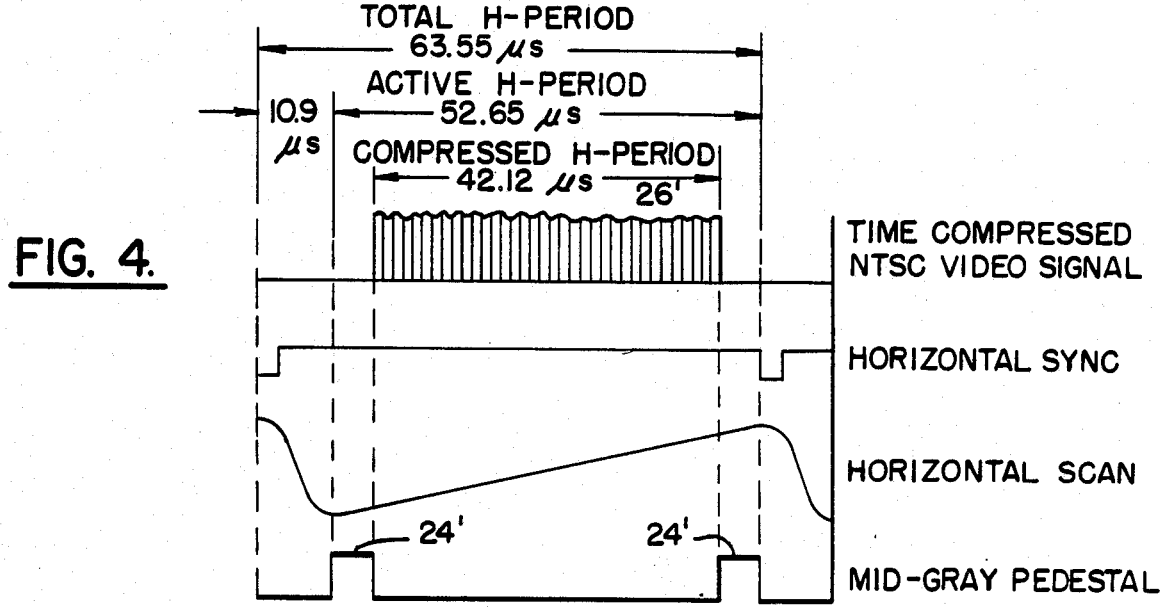
FIG. 4 is a diagram showing video and scanning waveforms for viewing NTSC pictures on an NTSC raster in a dual mode receiver.

The described technique can with minor modification (to be described) be used to promote uniform phosphor aging in a dual mode receiver in which NTSC picture information is viewed on a modified NTSC raster with a 5:3 aspect ratio as depicted in FIG. 4. In this case the total horizontal period is 63.55 microseconds, the active horizontal period is 52.65 microseconds and the horizontal scan frequency is 15734 Hz. To insure presentation of the NTSC picture on the area Y of the display, the incoming NTSC video signal is time-compressed by a factor k' equal to $(42.12\div52.65)=0.8$. The necessary time compression is accomplished in the same manner as that described in connection with FIG. 3, differing only in the respect that the incoming video signal is written into memory 10 at a rate $F_s$ and is read out of memory at a rate $(1\div k')F_s$. The time-compressed NTSC video signal is designated 26' in FIG. 4 and the mid-gray pedestal pulses, which are combined with the compressed video signal and applied to the cathode ray tube to illuminate the areas X of the display screen, are designated 24'. It will be understood that for this operational mode the horizontal scan rate is 15734 Hz instead of the 31468 Hz scan rate indicated FIG. 3.

In the event the mid-gray illumination is found obtrusive to the viewer, the areas X can be covered by mechanical shutters whenever the receiver is in the NTSC mode of operation, and the shutters removed when it is desired to display HDTV pictures.

Figure 5:
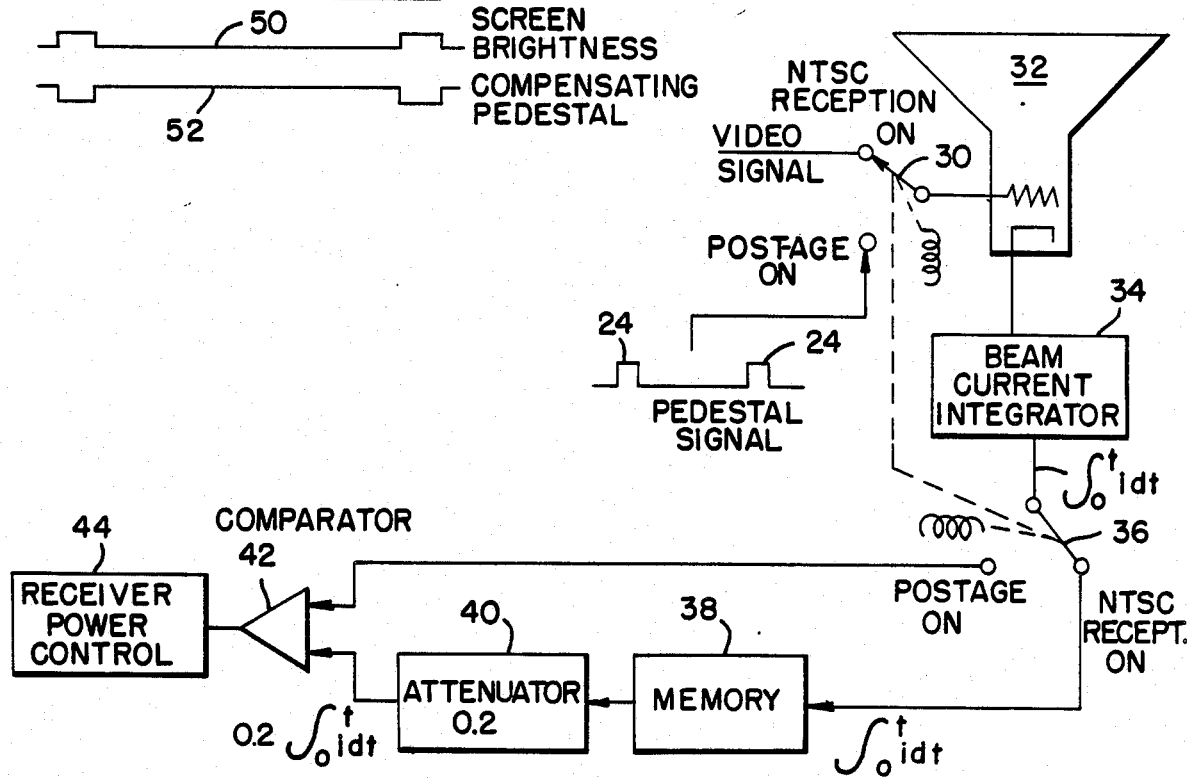
FIG. 5 is a block diagram of a circuit for providing post aging of the screen of the television display.

According to a second embodiment of the present invention the areas X of the display are allowed to remain dark (not illuminated) during NTSC reception by not using the described mid-gray pedestal pulses and later post aging the areas X by such an amount as to achieve substantially uniform phosphor aging over the entire area of the screen. Referring to FIG. 5, which is a block diagram showing only a portion of a television receiver, this is accomplished by storing the display beam current integrated over the time of NTSC operation, $$\int_0^t i \, dt,$$

and after the receiver is switched off by the user, restoring the receiver power and applying a pedestal signal which illuminates only the areas X of the display for a period of time until the post aging integrated beam current reaches $$0.2 \int_0^t i \, dt$$

and then shuts off the power. More particularly, during NTSC reception the input video signal is applied via a switch 30 in the position shown to the grid of a picture tube 32 which is scanned in one or the other of the scanning modes illustrated in FIG. 2 and FIG. 4. The cathode of the display tube is connected to a circuit 34 which integrates the display beam current over the time of operation; such integrating circuits are known and may take the form of a pulse counter where the pulse rate is proportional to current. The beam current-time product is applied via a switch 36 in the position shown to a memory 38, such as a counter, where it is stored until the receiver is turned off by the user.

Figure 2:
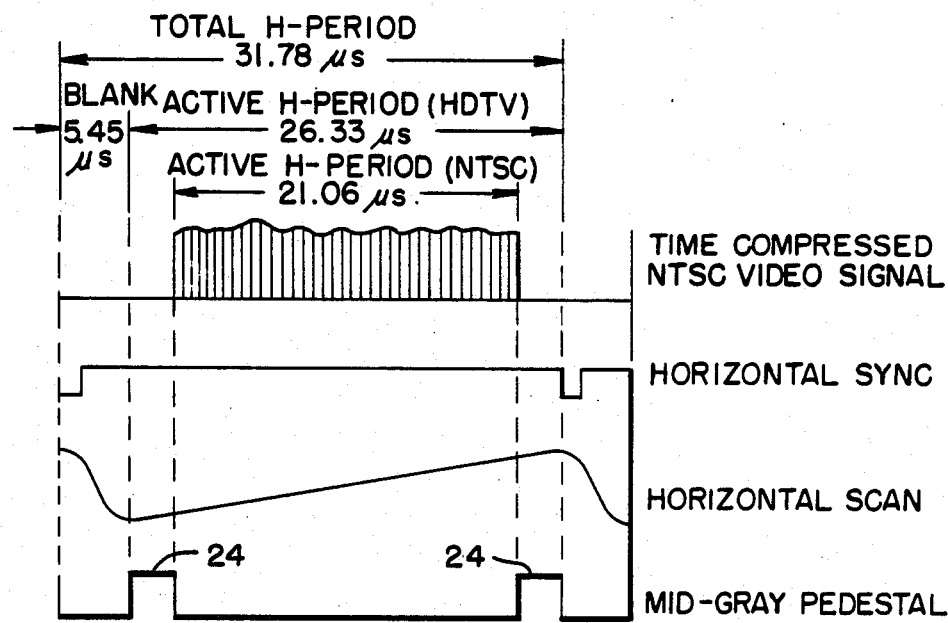
FIG. 2 is a diagram showing video and scanning waveforms for viewing NTSC pictures on an HDTV raster.

When the set is turned off both of switches 30 and 36 are switched to the "post age on" position. Receiver power (not shown) is restored, and a pedestal pulse 24 or 24' of mid-gray amplitude, generated as described in connection with FIGS. 2, 3 and 4 is applied via switch 30 to the grid of the display tube. The pedestal pulses are in timed relation with the scan circuitry and therefore illuminate only the areas X of the display. The product of the beam current caused by the pedestal pulses is integrated over time by circuit 34 and applied via switch 36 to one input of a comparator 42; the signal stored in memory 38 after attenuation by a factor of 0.2 in an attenuator 40 is applied to the other input of comparator 42. The reason for comparing the pedestal only beam current against only 20% of the stored beam current integrated over time because the areas X together represent only 20% of area Y. When the integrated value of the beam current caused by the pedestal pulses equals 20% of the beam current/time product stored in memory 38 during the NTSC viewing period, a signal from comparator 42 causes a receiver power control circuit 44 to de-energize the receiver. Thus, by the circuit of FIG. 5 the areas X can remain dark when viewing an NTSC picture while still achieving uniform aging of the display screen.

Figure 6:
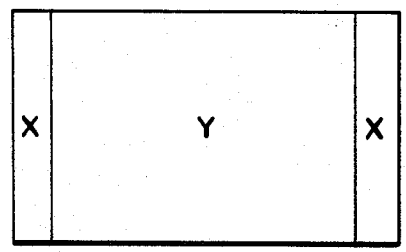
FIG. 6 is a diagram similar to FIG. 1 but additionally including waveforms illustrating how the third embodiment achieves brightness compensation.

In accordance with a third embodiment of the invention, which is similar to the just described embodiment in the respect that the areas X of the screen are allowed to remain dark during periods of NTSC reception which, of course, causes the area Y to age at a faster rate and to appear darker than the areas X during periods of HDTV reception. This effect is graphically shown in FIG. 6 in which the waveform 50 depicts in exaggerated fashion the brightness of the screen during HDTV reception of a screen that had been used to display NTSC pictures over an extended period. That is to say, the areas X of the screen are brighter than the area Y by some measurable amount. According to this aspect of the invention, brightness compensation, which can be done manually or automatically, is used during HDTV reception for causing the screen to appear to have uniform brightness.

For manual compensation, during HDTV reception only, a pedestal signal 52 is applied to the grid of the picture tube to increase the screen brightness in area Y and thus compensate for the increased phosphor aging in area Y. At the beginning of the display life, that is, when the picture tube is new, there is, of course, no aging and consequently the compensating pedestal signal is unnecessary and may be regarded as having zero amplitude. When darkening in the area Y becomes noticeable during HDTV reception, the level of the pedestal pulses is increased by manually adjusting a suitable control device in the television receiver (not shown) until the brightness of area Y is the same as the brightness of the areas X of the viewing screen.

Brightness compensation can also be accomplished automatically by integrating the display beam current over time during periods of NTSC reception and storing the value of this product and later using the stored value to automatically vary the level of the pedestal signal that brightens the area Y. A system similar to that illustrated in FIG. 5 may be used for this purpose.

In a color display, the red, green and blue phosphors may age differently, thereby changing the color balance in area Y as compared to areas X. Therefore, it may be necessary, and it is within the contemplation of the invention, to employ separate red, green and blue pedestal signals to vary both the total brightness and the color balance within area Y. This may be true for both manual and automatic brightness compensation; in the case of manual compensation the provision of separate brightness and color balance controls will make adjustment easier.

It will be understood that the above examples are only given to illustrate the inventive idea and that they are not limited to the form chosen and that variations are possible while maintaining the inventive idea. Other implementations of the disclosed circuitry, in particular for use in PAL or SECAM television systems, are also possible without departing from the spirit and scope of the invention.

I claim:

1. A dual mode television receiver capable of displaying on the same screen either a picture with a width-to-height aspect ratio of 4:3 or a picture with a width-to-height aspect ratio of 5:3, said receiver comprising:

a video signal input terminal adapted to be supplied with either a first type of television signal intended to be displayed as an image having an aspect ratio of 4:3 or a second type of television signal intended to be displayed as an image having an aspect ratio of 5:3;

image-producing apparatus coupled to said input terminal including display means having a screen with a width-to-height aspect ratio of at least 5:3 and which is subject to aging, and scan circuit means for producing a 5:3 aspect ratio image on said screen in response to said second type of television signal and for producing a 4:3 aspect ratio image, centrally located along the width dimension of said screen, in response to said first type of television signal; and circuit means operative in timed relationship with said scan circuit means for modifying the illumination of a selected area or areas of said screen for eliminating the adverse effect on the viewability of displayed images due to non-uniform aging of said screen due to display of 4:3 aspect ratio images for longer time periods than 5:3 aspect ratio images.

2. A dual mode television receiver according to claim 1, wherein said circuit means for modifying comprises means operative during reception and display of said first type of television signal for illuminating the areas of said screen at either side of the displayed 4:3 aspect ratio image at a brightness level substantially corresponding to the average brightness level of said displayed image.

3. A dual mode television receiver according to claim 1, wherein said circuit means for modifying comprises means operative, following a period of reception and display of said first type of television signal, for illuminating only the areas of said screen at either side of the central area on which the 4:3 aspect ratio image had been displayed during said period at such a brightness level and for such a period of time that the integrated value of the illumination substantially equals the integrated value of the illumination to which said central area was subjected during said reception and display period.

4. A dual mode television receiver according to claim 3, wherein said display means includes a cathode ray tube having a phosphor screen and wherein said last-mentioned means comprises means operative, during said display period, for storing a value proportional to the cathode ray tube beam current integrated over the time of said display period, means operative, following termination of said display period, for applying pedestal pulses of predetermined amplitude to said cathode ray tube for illuminating the areas of said screen at either side of said central area, means operative, during application of said pedestal pulses, for integrating over time the beam current of said cathode ray tube, and means for comparing the resulting integrated value with said stored value and operative to deenergize said receiver when said resulting value equals about 20% of said stored value.

5. A dual mode television receiver according to claim 1, wherein said circuit means for modifying comprises means operative, during reception and display of said second type of television signal, for applying to said cathode ray tube pedestal pulses having an amplitude such as to illuminate only the central area of said screen to have a brightness level substantially equal to the brightness level of the areas at either side of said central area.

6. A dual mode television receiver capable of displaying on the same screen either a picture with a width-to-height aspect ratio of 4:3 or a picture with a width-to-height aspect ratio of 5:3, said receiver comprising:

a video input terminal adapted to be supplied with either an NTSC television signal intended to be displayed as a 4:3 aspect ratio image or a high definition television (HDTV) signal intended to be displayed as a 5:3 aspect ratio image;

image-producing apparatus coupled to said input terminal including a cathode ray tube having a phosphor screen subject to aging with a width-to-height aspect ratio of at least 5:3, and scan circuit means for producing a 5:3 aspect ratio image on said screen in response to sa HDTV signal and for producing a 4:3 aspect ratio image, substantially centrally located along the width dimension of said screen, in response to said NTSC television signal; and circuit means operative in timed relationship with said scan circuit means for modifying the illumination of a selected area or areas of said screen for eliminating the adverse effect on the viewability of displayed images due to non-uniform aging of said screen due to display of 4:3 aspect ratio images for longer time periods than 5:3 aspect ratio images.

7. A dual mode television receiver according to claim 6, wherein said circuit means for modifying comprises means operative during reception and display of said NTSC television signal for generating and applying to said cathode ray tube pedestal pulses in timed relationship with said scan circuit means for illuminating the areas of said screen at either side of the displayed 4:3 aspect ratio image, said pedestal pulses having such amplitude as to illuminate said side areas to a brightness level substantially corresponding to the average brightness level of the displayed image.

8. A dual mode television receiver according to claim 6, wherein said circuit means for modifying comprises means operative, following a period of display on said screen of 4.3 aspect ratio NTSC images, for illuminating only the areas of said screen at either side of the central area on which the 4:3 aspect ratio image had been displayed during said period at such a brightness level and for such a period of time that the integrated value of such illumination substantially equals the integrated value of the illumination to which said central area was subjected during said display period.

9. A dual mode television receiver according to claim 8, wherein said last-mentioned means comprises means operative, during said period of reception and display of said NTSC television signal, for storing a value proportional to the cathode ray tube beam current integrated over the time of said display period, means operative, following termination of said display period, for applying to said cathode ray tube pedestal pulses of predetermined amplitude for illuminating the areas of said screen at either side of said central area, means operative, during application of said pedestal pulses, for integrating over time the cathode ray tube beam current, and means for continuously comparing the resulting integrated value of the beam current caused by said pedestal pulses with said stored integrated value and operative to de-energize said receiver when said resulting integrated value approximates 20% of said stored integrated value.

10. A dual mode television receiver according to claim 6, wherein said circuit means for modifying comprises means operative, during reception and display of HDTV images, for applying to said cathode ray tube pedestal pulses in timed relationship with said scan circuit means so as to illuminate only said central area and of such amplitude as to cause said central area to have a brightness level substantially equal to that of the areas at either side of said central area.

11. A dual mode television receiver capable of displaying on the same screen either a picture with a standard aspect ratio picture format or a picture with a wider than standard aspect ratio picture format and the same height as said standard picture format, said receiver comprising:

a video signal input terminal adapted to be supplied with either a first type of television signal intended to be displayed as an image having said standard aspect ratio picture format or a second type of television signal intended to be displayed as an image having said wider than standard aspect ratio picture format;

image-producing apparatus coupled to said input terminal including display means having a screen with said wider than standard aspect ratio and which is subject to aging, and scan circuit means for producing a wider than standard aspect ratio image on said screen in response to said second type of television signal and for producing a standard aspect ratio image, centrally located along the width dimension of said screen, in response to said first type of television signal; and circuit means operative in timed relationship with said scan circuit means for modifying the illumination of a selected area or areas of said screen for eliminating the adverse effect on the viewability of displayed images due to non-uniform aging of said screen due to display of standard aspect ratio images for longer time periods than wider than standard aspect ratio images.

12. A dual mode television receiver according to claim 11, wherein said circuit means for modifying comprises means operative during reception and display of said first type of television signal for illuminating the areas of said screen at either side of the displayed standard aspect ratio image at a brightness level substantially corresponding to the average brightness level of said displayed image.

13. A dual mode television receiver according to claim 11, wherein said circuit means for modifying comprises means operative, following a period of reception and display of said first type of television signal, for illuminating only the areas of said screen at either side of the central area on which the standard aspect ratio image had been displayed during said period at such a brightness level and for such a period of time that the integrated value of the illumination substantially equals the integrated value of the illumination to which said central area was subjected during said reception and display period.

14. A dual mode television receiver according to claim 13, wherein said display means includes a cathode ray tube having a phosphor screen and wherein said last-mentioned means comprises means operative, during said display period, for storing a value proportional to the cathode ray tube beam current integrated over the time of said display period, means operative, following termination of said display period, for applying pedestal pulses of predetermined amplitude to said cathode ray tube for illuminating the areas of said screen at either side of said central area, means operative, during application of said pedestal pulses, for integrating over time the beam current of said cathode ray tube, and means for comparing the resulting integrated va with said stored value and operative to deenergize said receiver when said resulting value equals about 20% of said stored value.

15. A dual mode television receiver according to claim 11, wherein said circuit means for modifying comprises means operative, during reception and display of said second type of television signal, for applying to said cathode ray tube pedestal pulses having an amplitude such as to illuminate only the central area of said screen to have a brightness level substantially equal to the brightness level of the areas at either side of said central area.

16. A dual mode television receiver capable of displaying on the same screen either a picture with a standard aspect ratio picture format or a picture with a wider than standard aspect ratio picture format and the same height as said standard picture format, said receiver comprising:

a video input terminal adapted to be supplied with either an NTSC television signal intended to be displayed with said standard aspect ratio picture format or a high definition television (HDTV) signal intended to be displayed with said wider than standard aspect ratio picture format;

image-producing apparatus coupled to said input terminal including a cathode ray tube having a phosphor screen subject to aging and said wider than standard aspect ratio, and scan circuit means for producing a wider than standard aspect ratio image on said screen in response to said HDTV signal and for producing a standard aspect ratio image, substantially centrally located along the width dimension of said screen, in response to said NTSC television signal; and circuit means operative in timed relationship with said scan circuit means for modifying the illumination of a selected area or areas of said screen for eliminating the adverse effect on the viewability of displayed images due to non-uniform aging of said screen due to display of standard aspect ratio images for longer time periods than wider than standard aspect ratio images.

17. A dual mode television receiver according to claim 16, wherein said circuit means for modifying comprises means operative during reception and display of said NTSC television signal for generating and applying to said cathode ray tube pedestal pulses in timed relationship with said scan circuit means for illuminating the areas of said screen at either side of the displayed standard aspect ratio image, said pedestal pulses having such amplitude as to illuminate said side areas to a brightness level substantially corresponding to the average brightness level of the displayed image.

18. A dual mode television receiver according to claim 16, wherein said circuit means for modifying comprises means operative, following a period of display on said screen of standard aspect ratio NTSC images, for illuminating only the areas of said screen at either side of the central area on which the standard aspect ratio image had been displayed during said period at such a brightness level and for such a period of time that the integrated value of such illumination substantially equals the integrated value of the illumination to which said central area was subjected during said display period.

19. A dual mode television receiver according to claim 18, wherein said last-mentioned means comprises means operative, during said period of reception and display of said NTSC television signal, for storing a value proportional to the cathode ray tube beam current integrated over the time of said display period, means operative, following termination of said display period, for applying to said cathode ray tube pedestal pulses of predetermined amplitude for illuminating the areas of said screen at either side of said central area, means operative, during application of said pedestal pulses, for integrating over time the cathode ray tube beam current, and means for continuously comparing the resulting in value of the beam current caused by said pedestal pulses with said stored integrated value and operative to de-energize said receiver when said resulting integrated value approximates 20% of said stored integrated value.

20. A dual mode television receiver according to claim 16, wherein said circuit means for modifying comprises means operative, during reception and display of HDTV images, for applying to said cathode ray tube pedestal pulses in timed relationship with said scan circuit means so as to illuminate only said central area and of such amplitude as to cause said central area to have a brightness level substantially equal to that of the areas at either side of said central area.

* * * * *